July 14, 1964  B. M. LINDNER  3,140,853
BEARINGS
Original Filed March 15, 1957  4 Sheets-Sheet 1
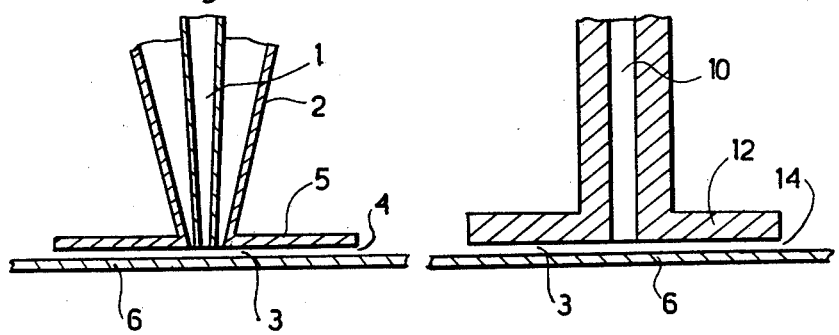

July 14, 1964     B. M. LINDNER     3,140,853
BEARINGS
Original Filed March 15, 1957     4 Sheets-Sheet 2
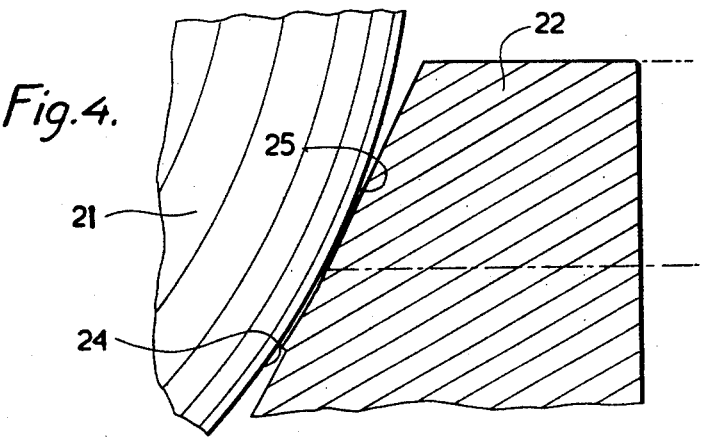
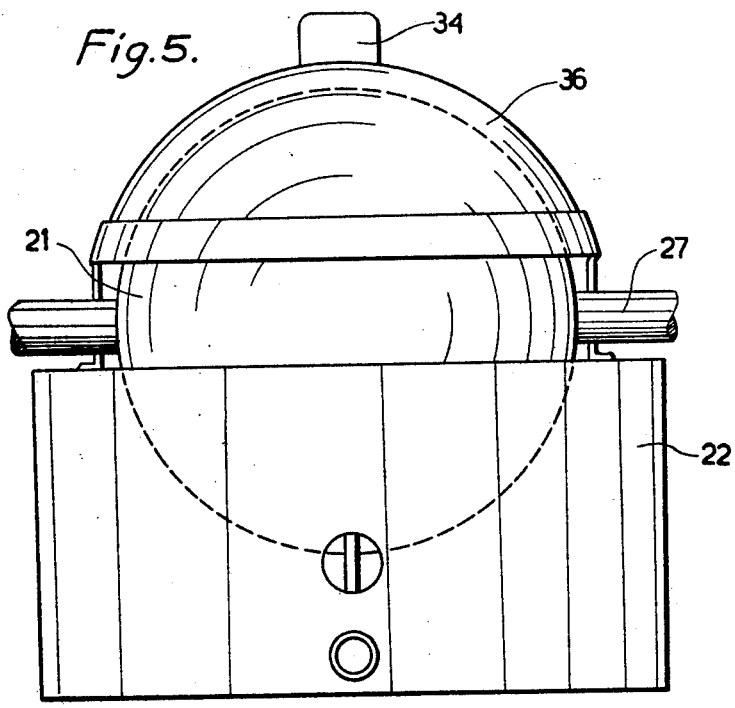

3,140,853
BEARINGS

Bror M. Lindner, Stockholm, Sweden, assignor to Alwac International, Inc., Nassau, Bahamas, a corporation of Panama
Continuation of application Ser. No. 646,491, Mar. 15, 1957. This application Mar. 28, 1960, Ser. No. 17,834
Claims priority, application Sweden Mar. 20, 1956
4 Claims. (Cl. 253—2)

This invention relates to bearings and more particularly to improvements in air bearings wherein a film of compressed air or other gas is supplied between the supporting and supported bearing surfaces to maintain the supported bearing surface airborne and out of direct contact with the supporting bearing surface during normal operation.

This application is a continuation of my copending application Serial No. 646,491 which is now abandoned.

Heretofore, air bearings of the type described above were normally used where they were not subject to or operable to support any appreciable radial load other than that attributable to the weight of the bearing rotor. These prior art constructions are primarily usable only in lightweight devices and particularly in instruments such as compasses as exemplified by the United States Letters Patent to Bibbins, bearing the No. 1,499,602 and issued July 1, 1924.

One of the primary drawbacks of using these previously known air bearings to support appreciable loads, and more particularly, loads that are radial, is that they are not adequate to rapidly build up sufficiently high resisting fluid pressures to withstand and compensate for sudden and abrupt changes in load of any appreciable magnitude. Consequently, the resisting air or gaseous film is broken down with the result that the rotating bearing element contacts the stationary support, thus scoring the bearing and causing it to lose its freedom.

A further disadvantage of these prior art bearings is that they are constructed and arranged in such a manner that the compressive forces on opposed sides of a rotor counteract each other with the result that the resulting supporting power becomes negligible.

According to the present invention, the relatively movable elements of the bearing form a gaseous pressure distribution chamber defining a normally operating predetermined clearance between the large interfitting surfaces of the bearing elements. This pressure distribution chamber is bordered by relatively small interfitting bearing surfaces on the bearing elements having an operating clearance which is less than the clearance provided by the pressure chamber by a predetermined magnitude to thereby form a reduced pressure throat region through which the supporting pressure fluid must pass in order to escape from the chamber into free air. The pressure chamber communicates with a source of gaseous pressure fluid or air so that the rotatable bearing element is supported by a thin pressurized air cushion filling the pressure chamber. The air in the pressure chamber is discharged through the throat region and upon entering the throat region, the discharging air reaches a maximum velocity, thus reducing the pressure to a minimum to establish a venturi effect for withdrawing air from the pressure chamber. Preferably, at least one of the bordering bearing surfaces is provided with an outer flared portion between the throat region and the free air and diverging outwardly away from the throat region so as to create an ejector effect to thereby reduce the pressure in the pressure chamber when the clearance between the bearing surfaces increases. The mouth of the supply passage delivering pressure fluid to the pressure chamber may also be bordered by a surface arranged to create a throttling effect in the case where the supported element approaches the mouth.

In a preferred embodiment of the present invention, an air powered and air supported rotor is adapted both to support and drive a substantial load. The rotor is provided with what are in effect turbine blades which are formed radially inwardly of the rotor surface of revolution so as not to inhibit its rotation and which are disposed in the path of the driving torque applying high velocity air streams such that a substantial driving torque, dependent upon the force exerted by the air jet, is exerted on the rotor. The rotor, when spherical in shape, is supported by a thin cushion of air almost hemispherical in extent and having a normal radial depth only approximately twice its minimum radial depth. By this construction, any changes in the depth of the supporting air layer due to changes in the radial load on the rotor will result in rapid pressure changes in the layer and large changes in the total supporting force of the air layer.

Accordingly, it is a primary object of the present invention to provide for a novel air bearing which is adapted to support appreciable loads and which has a rotor element supported by a thin layer of pressurized air having a normal radial operating depth that is only approximately twice the minimum radial depth and extending over a large surface of the supported element so that any change in the depth of the supporting air layer due to changes in the radial load on the rotor element will result in rapid pressure changes in the layer and large changes in the total supporting force of the air layer, thereby providing a rapid pressure build-up that readily withstands and compensates for abrupt changes in application of the load.

A further object of the present invention is to provide a novel air or gas bearing having a rotor element supported by a layer of pressurized air so that, during normal operation, it is out of direct contact and airborne with respect to the relatively stationary supporting bearing element wherein the interfitting bearing surfaces of the rotor and stationary elements form a gaseous pressure distribution chamber of a predetermined depth extending over a relatively large area of the bearing elements and a throat region of reduced depth which borders the pressure chamber and has a diverging portion for establishing a venturi effect to cause the rapid discharge of pressure fluid in the chamber to free air when the clearance between the bearing elements tends to increase beyond a predetermined magnitude.

A further object of the present invention is to provide a novel air bearing having an air powered and air supported rotor adapted both to support and drive a substantial load.

Still another object of the present invention is to provide a novel air bearing having an air powered and air supported rotor which is provided with what are in effect turbine blades formed radially inwardly of the rotor surface of revolution so as not to inhibit its rotation and disposed in the path of driving torque applying air streams so that a substantial driving torque, dependent upon the force exerted by the air stream, is exerted on the rotor.

A further object of the invention is to provide a bearing construction, in which the bearing members at opposed sides of a rotor create a considerable resultant force which counteracts the oscillating movements of the rotor.

Referring to the drawings in which several forms of my invention are shown:

FIGS. 1 and 2 show diagrammatically different stages of development of the bearing;

FIG. 3 is a vertical section through a bearing for a spherical rotor;

FIG. 4 shows a portion of said section on an enlarged scale;

FIG. 5 is a side view of the arrangement shown in FIG. 3;

Figure 6:
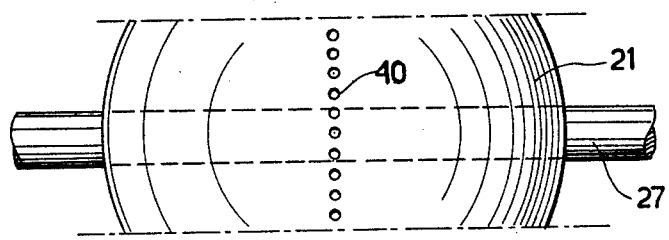
FIG. 6 is a partial view of the rotor surface.

The primary hydraulic principle incorporated by the present invention is embodied in the operation of a jet pump in which the working medium produces a vacuum or suction effect to promote movement of the working medium from an inlet to an outlet. In order to exemplify this hydraulic principle, a jet pump as shown in FIGURE 1 is modified to embody the object of the present invention and comprises a jet pipe 1 through which the working medium is introduced. Pipe 1 is arranged within a passage 2 and both pipe 1 and passage 2 open into a space 3 corresponding to the common outlet passage of the jet pump wherein the direction of flow is radial. An outlet 4 of space 3 follows the edge of a disc 5 connected to the wall of passage 2. Pipe 1, passage 2 and disc 5 form a unit movable relatively to a wall 6. A layer of compressed fluid is introduced into space 3 and supports the jet pump together with disc 5 so that it is airborne and floats over wall 6. The cross sectional area of pipe 1 is less than the depth of space 3.

By this structure, it will be appreciated that fluid which is introduced into pipe 1 under an initial pressure and velocity, flows into space 3 for discharge through outlet 4. As the fluid enters space 3, the velocity is increased due to the reduction in flow area and the pressure of the fluid at this point is consequently reduced. This enables fluid of relatively higher pressure in passage 2 and surrounding pipe 1 to be sucked or drawn into space 3 by the pressure differential existing between space 3 and pipe 1.

In order to adapt the principles of the jet pump of FIGURE 1 for use in a bearing assembly, the pump structure of FIGURE 1 is modified essentially, as shown in FIGURE 2. With continued reference to FIGURE 2, it is seen that the pipe 1 of FIGURE 1 is replaced by a supply passage 10 for the working medium or medium under pressure, and the passage 2 of FIGURE 1 has been omitted. Space 3 is bordered upwardly by a disc 12, which replaces the disc 5 of FIGURE 1.

In operation, wall 6 and disc 12 constitute the relatively moving stator and rotor bearing elements of the assembly.

By this structure, the ejector effect of the jet pump may be fully utilized for producing a low pressure zone or suction effect in the space 3. Air under pressure received in passage 10 at an initial velocity and pressure is discharged into space 3 where, due to the reduction of cross-sectional flow area, the velocity is increased to thereby cause a corresponding reduction in static pressure. The layer of air in space 3 maintains the disc or bearing member 12 airborne and out of contact with respect to wall 6.

When the bearing member 12 is loaded, the depth of space 3 diminishes and a certain throttling effect is obtained in space 3. The supporting capacity of bearing member 12 is approximately equal to the area of its surface which borders space 3 multiplied by the mean value of the pressure in space 3. The capacity of absorbing impact strains of short duration is, as a plurality of tests have proved, at least twice the static supporting capacity due to the small clearance between the disc 12 and the wall 6, which is preferably kept less than .004 of an inch.

When the depth of space 3 is reduced by increasing the load on bearing member 12, it will be appreciated that the rate of fluid flow therethrough is greatly diminished due to the increase of friction head losses. Pressure in space 3, therefore, builds up and tends to maintain bearing member 12 at a predetermined distance over wall 6.

The ejector effect appears upon an increase of the clearance between bearing member 12 and the wall 6, as in the case where bearing member 12 is fixed and wall 6 is loaded. The fluid flow from the passage 10 gives rise to a fluid film in space 3 having a radial particle movement. Provided the fluid flow entirely fills the annular outlet 14 at the edge of the disc 12, the upper side of the wall 6 inside the outlet 14 is not exposed to the atmospheric pressure, but only to the static and kinetic vertical pressure existing at the mouth of the passage 10. The atmospheric pressure on the under side of the wall 6 inside the outlet 14 will push the wall, when in an optimum position, towards bearing member 12.

Bearing member 12 and wall 6 may be convex or concave with spherical, cylindrical, conical or other shape suitable for a rotor.

According to the invention it is essential that two bearing members disposed diametrically in relation to a rotor may alternately and automatically afford the requisite bearing pressure, without the pressure force produced by one bearing member being counteracted by the pressure force at the other bearing member as in the case of a shaft journalled in the bearing which tends to oscillate.

Referring now to FIGURES 3–6, a rotor 21 which is preferably spherical in shape is carried by a bearing cup 22, to which compressed air is supplied through a passage 23. Other gaseous or liquid fluid under pressure may also be used, for instance steam, water or the like. The compressed air flows from passage 23 into a space or pressure chamber 24 which is almost hemispherical in shape and which is formed by the opposed interfitting bearing surfaces 24a and 24b of rotor 21 and cup 22 respectively. Approximately adjacent to the equatorial line of rotor 21 and cup 22, cup 21 is provided with a raised bearing surface 25, as best shown in FIGURE 4, which borders pressure chamber 24 and defines a throat section of reduced cross-sectional flow area through which the compressed air in chamber 24 must pass in order to discharge to free air. The clearance at the surface 25 is preferably kept less than .004 of an inch when rotor 21 is floating during normal operation. The normal running clearance between surfaces 24a and 24b is approximately twice the clearance between surfaces 25 and 24a. Thus, when the supply of pressure fluid is cut off rotor 21 is carried by surface 25 and in this position the clearance in the space 24 is preferably .004 of an inch or less. Between bearing surface 25 and an outlet 26 opening to free air, cup 21 is provided with a diverging wall portion 26a which diverges outwardly from the throat formed by bearing surface 25.

By this structure, that compressed air or other gas flows into pressure chamber 24 at an initial pressure and velocity. As the air enters the throat section defined by surface 25, its velocity is increased to a maximum and its static pressure is correspondingly reduced to minimum. When discharge of air is into free air, the pressure, it will be appreciated is less than atmospheric thus establishing an ejector effect to promote movement of compressed air out of chamber 25. After passing through the throat section, the air loses velocity and the pressure is correspondingly increased to facilitate discharge of the air through outlet 26. A suitable balance between air pressure, clearances and weight of the rotor is present when that air film which from the passage 23 is spread over the rotor calotte in the space 24, can in the main escape between the bearing surface 25 and the rotor. If for a moment the tolerance is too small, the air will be collected in the space 24 and the pressure will increase therein so that the rotor is lifted. In case, on the other hand, the tolerance would for a moment be too great, there is produced an ejector effect at the bearing surface 25 so that part of the air stored in the space 24 is entrained out of the space by the air film, whereby, independently of the pressure in the air film layer, a suction is built up in said space. By this, the rotor is rapidly brought back into a stable position. The same course is obtained if the tolerance at the one side of the rotor varies.

According to FIGURES 3–6, the bearing cup 22 is provided with driving members for the rotor 21. In the use of the rotor for gyro compasses and the like, the rotor is equipped with a fixed or freely mounted shaft 27. This is also the case when two or more rotors are driven conjointly.

FIGURE 3 shows a driving jet 30 having a regulating valve 31, for supplying compressed air at the lower portion of the rotor in the space 24. In this instance there is obtained a rotation in a clockwise direction according to FIGURE 3. The surface of the rotor may be smooth, grooved or formed with other suitable depressions over the entire surface or along a narrow annular zone for cooperating with the nozzle or the nozzles in case several nozzles open into the space 24 or are located above the bearing cup 22, as shown at 32 and 33. According to the present embodiment, these nozzles are controlled individually and disposed in a pressure chamber 34 to which, via a passage 35, compressed air is supplied. The chamber 34 carries an accelerating casing 36 enclosing the upper portion of the rotor and united with the bearing 22 on that side of the rotor which has an upward movement.

The casing 36 is located at such a distance from the rotor that the air flow from the bearing 22 and the nozzles 33 and 32 are brought to follow the surface of the rotor in order to reduce the air friction.

Indentations 40 shown in FIGURE 6 are disposed at mutually equal distances over a circular zone of the sphere 21. These indentations 40 provide rotor 21 in effect with turbine blades which are formed radially inwardly of the rotor surface of revolution so as not to inhibit its rotation and which are disposed in the path of the driving torque applying air streams so that a substantial driving torque, dependent upon the forces exerted by the air jet, is exerted on the rotor.

According to the invention, the shape of the rotor is not limited to be spherical, but the rotor may be formed with a cross section through the rotor axis which is elliptical, rhomboidal or composed of deversiform surfaces of revolution located at different radial distances from the rotor shaft and of such character that for each of these surfaces a bearing surface 25 or the like may be connected to a space of distribution of pressure.

In the embodiment described above, the bearing consists of a cup shaped body, which encloses approximately half the rotor. However, it is in some cases desirable to make the bearing enclose substantially the entire rotor. For this purpose, a bearing cup is provided which encloses the upper portion of the rotor and which may be designed identically in the same manner as the bearing 22. An annular free slit between the two bearing parts 22 serves as a discharge opening for the pressure fluid.

Figure 7:
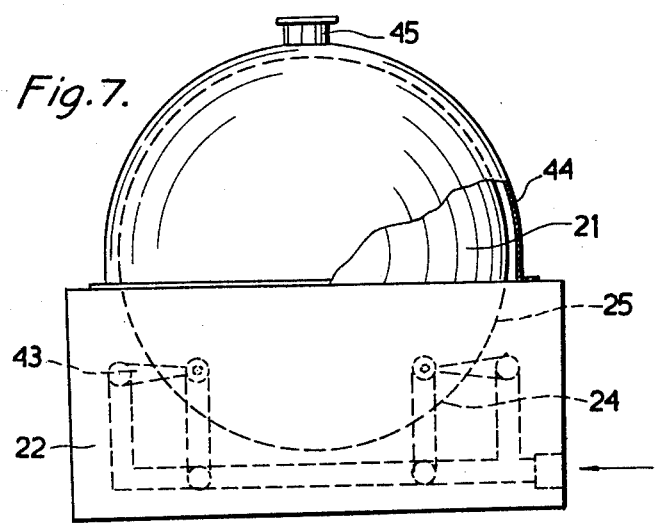
FIG. 7 shows, in side view, a bearing provided with driving means for a rotor with a vertical axle of rotation.

It will be evident that the rotor may be brought to rotate about an axle having any desired inclination, thus also about a vertical axle, as shown in FIGURE 7. The rotor is supported in the same manner as described in connection with FIGURE 3, where the passage 23 possibly may be closed, while the nozzle 30 alone is sufficient for maintaining the pressure in the space 24.

FIGURE 7 shows four nozzles 43 having a horizontal blast direction and arranged in the tangential direction of a circle, the radius of which is approximately equal to half the radius of the rotor. The pressure space 24 and the bearing surface 25 are in the form stated in connection with FIGURE 3. The passage 23 according to the last mentioned figure may be omitted, unless the rotor has a particularly high specific gravity. In the annular zone passing the nozzle openings, the rotor is provided with indentations of the kind previously mentioned. Instead of the accelerating casing 36 a spherical hood 44 is attached to the bearing 22 and provided with a discharge opening 45 at its upper portion. The outlet 45 of the hood may, if desired, be connected to an evacuating device, for instance the intake of the source of pressure.

The rotor may, of course, be driven solely by the aid of a rotating magnetic field, or in combination with the driving members stated above. Such a rotor driven by a magnetic field is of particular importance in cases where it is desirable to obtain certain extremely high numbers of revolutions capable of being exactly determined, as, for example, in photographing processes of short duration.

When the rotor is arranged to rotate about a vertical axis or about an axis having a substantial inclination, the configuration of the rotor above the bearing cup is of no importance for the mounting proper. The upper portion of the rotor may be given any desired suitable shape or be entirely dispensed with. The lower rotor portion and the bearing cup may be confined by a surface of revolution having a shape diverging from spherical surface. The rotor may be formed as a hollow hemisphere with passageway for the pressure fluid, the inner surface of the hemisphere being for instance spherical and serves as a bearing cup for supporting a second rotor.

Figure 8:
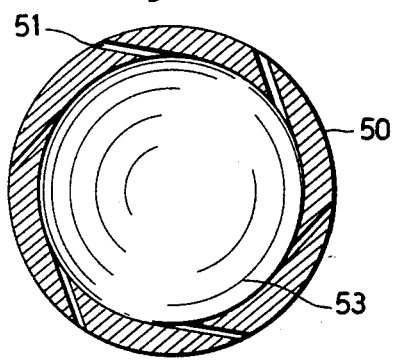
FIG. 8 is a section taken on a diametrical plane of a modified rotor.

The rotor may also be driven as a reaction turbine, as shown in FIGURE 8. Here a rotor 50 is hollow and provided with passages 51 angularly disposed with respect to the radius. Compressed air from the space 24 feeds the cavity 53 of the rotor, from which the air escapes through the passages 51 while creating a reaction torque on the rotor. Also in this case the upper portion of the rotor may be enclosed by an evacuating hood such as the hood 44 in FIGURE 7 for increasing the pressure drop and reducing the air resistance.

Figure 9:
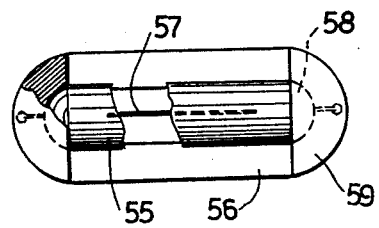
FIG. 9 shows, in plan view, a cylindrical rotor having spherical end portions.

FIGURE 9 shows a cylindrical rotor 55 with an appertaining bearing 56, which latter is provided with a slot shaped air supply passage 57 extending along the rotor at the lowest portion of the same.

The end portions 58 of the rotor are, according to the example shown, hemispherical with the same radius as the cylindrical rotor and mounted, like the spherical rotor above described, by the aid of semispherical bearing cups serving as thrust bearings. These latter or the bearing 56 may be provided with driving nozzles of the kind above described. The rotor 55 shown in FIGURE 9 is particularly suitable as a carrier of a set of mirrors having small dimensions and being distributed on the circumference and situated within the cylindrical surface. In the use of transparent material, the mirrors may be cast into the mass.

Figure 10:
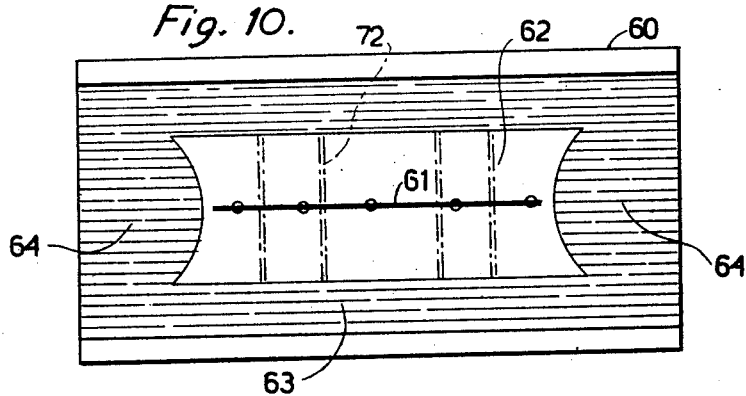
FIGS. 10 and 11 show an axle bearing in plan view and end view, respectively.
Figure 11:
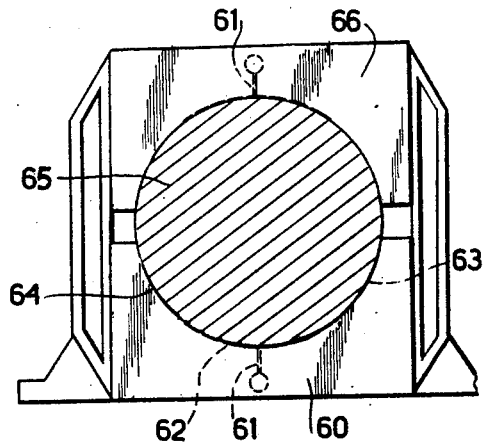

However, one or both of the end bearings 58 may be entirely dispensed with, and the bearing space may have a substantially semicylindrical shape with outwardly open end portions, as shown in FIGURES 10 and 11.

FIGURE 10 shows a bearing part 60 in plan view, where the pressure medium enters through a slit shaped opening 61 into a chamber of distribution of pressure 62. Instead of a slit shaped opening, a series of smaller openings may be used, as marked in FIGURE 10, for the supply of pressure fluid. This is true also of the passage 57 according to FIGURE 9. Said chamber 62 is confined, in a direction transverse to the shaft 65, by bearing surfaces 63 and in the longitudinal direction of the shaft by bearing surfaces 64. The chamber 62 and the bearing surfaces 63 are arranged according to the same principle as the chamber 24 and the bearing surface 25 of FIGURES 3 and 4, the surfaces 64 having a smaller clearance in relation to the shaft 65 (FIGURE 11) than the bottom wall of chamber 62 when shaft 65 is airborne with respect to member 60. Thus, it will be appreciated that bearing surface 64 and the outer periphery form a throat section of reduced cross-sectional flow area through which the pressure fluid passes from pressure chamber 62.

In FIGURE 11, which shows the bearing member 60 above described in end view, the bearing assembly is completed by an upper bearing member 66 identical with that shown in FIGURE 10 so that the shaft 65 is enclosed by the bearing members except two diametrically opposed outlet zones 65a for the pressure fluid. When the shaft is displaced from its central position, the compressive force from one bearing member increases, and the compressive force from the other bearing member decreases or is replaced by a suction effect in accordance with the previous statements. The two bearing members 60 and 66 are maintained in spaced relation by the aid of yokes, for example, or other standard parts.

Figure 12:
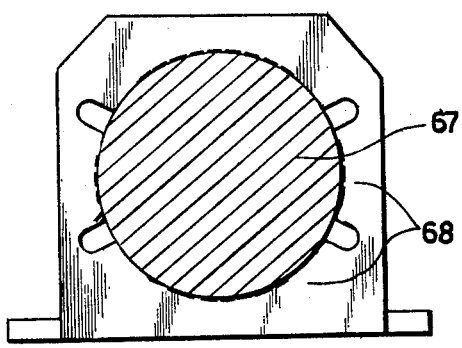
FIG. 12 is an end view of a modified axle bearing.

According to FIGURE 12, a shaft 67 is journalled in a bearing composed of four bearing parts 68 built according to the invention spaced from each other by means of outlet channels for the pressure fluid and provided with passages for supply of pressure fluid as above described. The number and the embracing angle of the bearing parts 68 may be chosen at will. It will be evident that driving means may be provided in the bearing parts 60, 66 and 68 in the same manner as in the spherical bearings above described, whereby the pressure fluid is utilized twofold.

Obviously, a spherical bearing may also consist of a plurality of bearing parts, not only of one or two, as stated above.

Finally, it should be pointed out that a rotor mounted according to the invention may be driven without the use of the driving nozzles above described. This is effected merely by a certain inclination of the bearing cup so that the tolerance at the bearing surface 25 on one side of the rotor becomes greater than on the opposite side. FIGURE 3 shows set screws 70 on the under side of the bearing cup 22, by means of which screws the bearing may be inclined in the desired direction and to the desired extent. In this case, air under pressure has only to be supplied through the central passage 23.

The bottom of the space of pressure distribution, according to FIGURE 3 the space 24 and according to FIGURE 10 the chamber 62, may be provided with thin strips or ribs passing substantially in the direction of flow of the air film and, if desired, fitting the form of the surface of the rotor when this latter rests in the bearing while the supply of compressed air is cut off. The strips or ribs divide the space of pressure distribution into a number of sections, all of which are in open communication with the supply passages for the pressure fluid. Such ribs are shown in FIGURE 10 and designated with 72. The ribs are connected with the bearing surfaces 63. By this, the pressure fluid is prevented to flow in the longitudinal direction of the shaft and the supporting capacity of the bearing increases. If the space of pressure distribution has a small depth, e.g. .002 of an inch or less, the ribs may be dispensed with and the surface of the space may be grooved or gauffered or in any other way formed as a surface having a great air friction.

As described above the bearing members according to the invention embrace less than the half of the rotor and are provided with a chamber for distribution of pressure having a small depth in order to permit an oscillating rotor to create essential pressure variations in said chamber. As a necessary condition for the pressure variation said chamber must have a small depth and be bordered by a bearing surface arranged with such a small clearance that a throttling effect is obtained in case the clearance due to oscillation of the rotor tends to diminish and formed in such a way that an ejector effect sets in in the case the clearance tends to increase. Said ejector effect reduces the pressure and may create a suction effect emptying, by means of the fluid film flowing over the rotor surface, the chamber of distribution of pressure in regard to the pressure fluid collected therein. In order to prevent the pressure fluid to return through the supply passage in the case of overpressure in the pressure chamber, due to oscillations of the rotor, said passage may be provided with a check valve. Instead of such a valve the mouth of the supply passage may be bordered with a surface so raised above the bottom surface of the chamber that a throttling effect is created when the rotor approaches said mouth of the supply passage.

The interfitting surfaces of the supported and the supporting elements may also be plane or convex, and the pressure distribution chamber is also in this case bordered by a bearing surface forming a small clearance and adapted to create an ejector effect. The throttling of the fluid flow at the mouth of the supply passage is to advantage also in the use of plane or convex surfaces.

Of course, the rotor and the bearing may be made of any desired suitable material, since there is no surface contact between them during the run of the rotor. From a manufacturing point of view, a material capable of being cast is preferable.

A field of employment, in which the arrangement according to the invention is particularly suitable, is the study and the application of ultrasonic phenomena.

Although not mentioned above, it is evident that the bearings, by their outlets for the pressure fluid, may be connected to an evacuating device, while the supply passages may communicate with the atmosphere. In this case there cannot, of course, be obtained greater pressure differentials between the inlet and outlet than the atmospheric pressure, which, however, in several cases is sufficient for obtaining the desired effect.

In connection with the arrangement shown in FIGURE 10 it may be mentioned that it is conceivable that the shaft is arranged stationary in the form of a rail and that the bearing member is sliding along the rail like a skid runner.

When it is a question of longitudinal relative motion between the bearing and the rail, this latter may have a cross-sectional form adapted to the purpose presenting a plane, convex or concave surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an air bearing assembly, a rotor for carrying a load applied perpendicularly to the rotor rotational axis and having an external bearing surface of revolution convexly curved with respect to the rotational axis of said rotor; and a support structure supporting and receiving said rotor and having an interior cup shaped segmental surface of revolution substantially complementary to said rotor external bearing surface and forming a single centrally located cup shaped pocket; means including a passage opening centrally into said pocket for introducing a compressible fluid under pressure into said pocket for maintaining said rotor continuously airborne on a compressed layer of said fluid and out of contact with said support structure, the portion of said layer of compressed fluid in said pocket having a predetermined depth during normal operation; the segmental surface forming a margin around said pocket and cooperating with said rotor to define an annular outlet surrounding said rotor when said rotor is airborne for discharging said fluid in said pocket to free air with said segmental surface being shaped to form with said rotor an annular fluid passage throat region and a fluid passage flared region between said support structure and said rotor, said throat region being disposed adjacent the extremity of said pocket and having a depth that is substantially less than said predetermined compressed fluid layer depth at said pocket when said rotor is airborne, said flared region being disposed around said rotor between said outlet and said throat region and diverging outwardly toward said outlet whereby the pressure of fluid in said throat region is substantially less than the pressure of fluid in said pocket and less than the pressure of air at said outlet.

2. The air bearing assembly defined in claim 1 comprising means for directing at least one stream of pressurized compressible fluid against the periphery of said rotor and at an angle to the rotational axis of said rotor, said stream being operable to exert a driving torque on said rotor.

3. The air bearing assembly as defined in claim 2 wherein a common source of compressible fluid under pressure is provided for supporting and driving said rotor.

4. The air bearing assembly as defined in claim 2 wherein said rotor is provided with means in the path of said stream effectively defining turbine blades inwardly of said rotor surface of revolution whereby said rotor is driven in the manner of a turbine rotor while maintaining its external surface of revolution free of radially outward projections.

References Cited in the file of this patent

UNITED STATES PATENTS

| | | |
|---|---|---|
| 506,779 | Harrison | Oct. 17, 1893 |
| 585,445 | Lumb | June 29, 1897 |
| 1,629,577 | Klahn | May 24, 1927 |
| 2,459,826 | Martellotti | Jan. 25, 1949 |
| 2,602,632 | Serduke | July 8, 1952 |
| 2,645,534 | Becker | July 14, 1953 |
| 2,660,484 | Gerard et al. | Nov. 24, 1953 |
| 2,660,485 | Gerard | Nov. 24, 1953 |
| 2,854,298 | Baumeister | Sept. 30, 1958 |
| 2,898,764 | Kinsey et al. | Aug. 11, 1959 |
| 2,915,902 | Brugger | Dec. 8, 1959 |